US012690512B2

(12) United States Patent
Hillard et al.

(10) Patent No.: US 12,690,512 B2
(45) Date of Patent: Jul. 28, 2026

(54) LARGE SEALING LID WITH SLIDES AND LOCK

(71) Applicant: Deere & Company, Moline, IL (US)

(72) Inventors: Kirk P. Hillard, Davenport, IA (US); Derryn Pikesh, Geneseo, IL (US)

(73) Assignee: Deere & Company, Moline, IL (US)

( * ) Notice: Subject to any disclaimer, the term of this patent is extended or adjusted under 35 U.S.C. 154(b) by 5 days.

(21) Appl. No.: 18/808,139

(22) Filed: Aug. 19, 2024

(65) Prior Publication Data

US 2024/0407282 A1 Dec. 12, 2024

Related U.S. Application Data

(63) Continuation of application No. 17/482,551, filed on Sep. 23, 2021, now Pat. No. 12,063,878.

(51) Int. Cl.
A01C 15/00 (2006.01)
A01C 23/00 (2006.01)

(52) U.S. Cl.
CPC .......... A01C 15/005 (2013.01); A01C 23/008 (2013.01)

(58) Field of Classification Search
CPC ... A01C 15/005; A01C 23/008; A01C 15/006; B60P 3/226; B65D 43/26; B65D 90/10; B65D 88/128; B65D 43/20
USPC ................. 220/562, 811, 812, 813, 814, 815
See application file for complete search history.

(56) References Cited

U.S. PATENT DOCUMENTS

| | | | | |
|---|---|---|---|---|
| 2,960,367 | A | * 11/1960 | Yodice | F16J 13/18 298/17 R |
| 3,961,723 | A | 6/1976 | Eckel | |
| 10,322,658 | B2 | 6/2019 | Borkgren et al. | |
| 2006/0213909 | A1 | 9/2006 | Epp et al. | |
| 2017/0073155 | A1* | 3/2017 | Borkgren | B65D 25/28 |

FOREIGN PATENT DOCUMENTS

KR 20000020255 U 11/2000

OTHER PUBLICATIONS

Extended European Search Report issued in European Patent Application No. 22194141.2, dated Feb. 20, 2023, in 5 pages.

* cited by examiner

Primary Examiner — Laura E. Parker
(74) Attorney, Agent, or Firm — Taft Stettinius & Hollister LLP; Stephen F. Rost

(57) ABSTRACT

A closure assembly includes a tank opening flange that surrounds a tank opening of a supply tank and a tank lid that covers the tank opening. The tank lid is operable between open and closed positions. A compression seal is attached to an underside of the tank lid and is disposed between the tank opening flange and the tank lid when the tank lid is in the closed position. A pair of guides are attached to opposite sides of the tank opening flange wherein each of the pair of guides defines a track opening to receive a plurality of sliding mechanisms attached to the tank lid. The track opening guides the sliding mechanisms and the tank lid around the tank opening flange such that the compression seal does not engage the tank opening flange when the tank lid is operated between the closed and open positions.

19 Claims, 15 Drawing Sheets

LARGE SEALING LID WITH SLIDES AND LOCK

RELATED APPLICATIONS

This application is a continuation of U.S. patent application Ser. No. 17/482,551, filed Sep. 23, 2021, the disclosure of which is hereby incorporated by reference in its entirety.

FIELD OF THE DISCLOSURE

The present disclosure relates to closure mechanisms, and in particular to a sealing lid for openings in tanks of agricultural machines.

BACKGROUND OF THE DISCLOSURE

Agricultural machines often carry large supply tanks or containers for different types of materials. Some types of materials include liquid or dry materials, such as fertilizers, seeds, and other agricultural products. The supply tanks typically have large openings at their tops that are used to fill the tanks with the agricultural products. Generally, there are two types of lids that are typically used to seal these large openings. The first type of lid is a clamshell or clamping lid that pivots open from one side. One issue with the clamshell lid is that the lid does not slide away from the opening to allow for full access of the opening which hinders filling the tank with agricultural product. A second type of lid lifts vertically away from the track and then the lid slides horizontally away from the opening to allow for full access of the opening. As the second type of lid slides and lifts away from the track, a seal is exposed to the environment that is often filled with air pollutants from the agricultural products that are added to the tank when the second type of lid is opened. The second type of lid includes many complex components that operate to vertically lift the lid and then horizontally slide the lid rearwardly wherein these complex components often break with continued usage. Moreover, as the seal becomes filled with air pollutants the second type of lid cannot completely close or seal the large opening because the pollutants become trapped in the seal and block the lid from closing.

Therefore, further contributions in this area of technology are needed to increase efficiency, increase productivity, and increase the case of operation of sealing lids for openings in tanks of agricultural machines. Therefore, there remains a significant need for the apparatuses, methods, and systems disclosed herein.

SUMMARY

According to one embodiment of the present disclosure, in an agricultural machine having a supply tank with a tank opening, a closure assembly comprising: a tank opening flange configured to surround the tank opening; a tank lid operable between an open position and a closed position, the tank lid while in the closed position configured to cover the tank opening, the tank lid while in the open position configured to uncover the tank opening, the tank lid having a first lid flange opposite a second lid flange; a clevis mechanism operably attached to both of the second lid flange and the tank opening flange to enable the tank lid to pivot about the tank opening flange; a plurality of sliding mechanisms attached to the tank lid; and a pair of guides attached to opposite sides of the tank opening flange, each of the pair of guides defines a track opening for receiving the plurality of sliding mechanisms such that the tank lid slides along the track openings of the pair of guides when the tank lid is operated between the open and closed positions.

In one example, further comprising: one or more compression seals attached to an underside of the tank lid, the one or more compression seals disposed between the tank opening flange and the tank lid when the tank lid is in the closed position.

In a second example, further comprising: a locking system configured to retain the tank lid in a locked position.

In a third example, wherein the locking system is configured to operably engage and lift the tank lid away from the tank opening.

In a fourth example, wherein the clevis mechanism includes a clevis pin operably engaged with a clevis opening in the tank opening flange such that the clevis pin rotates in the clevis opening.

In a fifth example, wherein the clevis opening is configured such that the clevis pin exits the clevis opening when the tank lid is in the open position.

According to another embodiment of the present disclosure, in an agricultural machine having a supply tank with a tank opening, a closure assembly comprising: a tank opening flange configured to surround the tank opening; a tank lid operable between an open position and a closed position, the tank lid while in the closed position configured to cover the tank opening, the tank lid while in the open position configured to expose the tank opening; a pivotable mechanism operably attached to both of the tank lid and the tank opening flange to enable the tank lid to pivot about the tank opening flange; a plurality of sliding mechanisms attached to the tank lid; and a pair of guides attached to opposite sides of the tank opening flange, each of the pair of guides defines a track opening configured to receive the plurality of sliding mechanisms such that the tank lid slides along the track openings of the pair of guides when the tank lid is operated between the open and closed positions.

In one example of this embodiment, further comprising: one or more compression seals attached to an underside of the tank lid, the one or more compression seals disposed between the 6 tank opening flange and the tank lid when the tank lid is in the closed position.

In a second example, wherein the pivotable mechanism includes a clevis pin operably engaged with a clevis opening in the tank opening flange such that the clevis pin rotates in the clevis opening.

In a third example, wherein the sliding mechanisms include rollers that move along the track openings to a climax portion of the track openings such that the tank lid is in a raised position and the clevis pin is released from the clevis opening.

In a fourth example, wherein at least one of the rollers in the climax portion of the track opening includes at least one of the compression seals having cleared the tank opening flange.

In a fifth example, wherein the sliding mechanisms include rollers that move along the track openings to an end opening such that the tank lid is lower than a top of the tank opening flange and the tank opening is uncovered when the tank lid is in the open position.

In a sixth example, further comprising: a locking system configured to retain the tank lid in a locked position.

According to another embodiment of the present disclosure, in an agricultural machine having a supply tank with a tank opening, a closure assembly comprising: a tank opening flange configured to surround the tank opening; a tank lid operable between an open position and a closed position, the tank lid while in the closed position configured to cover the tank opening, the tank lid while in the open position configured to uncover the tank opening; one or more compression seals attached to an underside of the tank lid, the one or more compression seals disposed between the tank opening flange and the tank lid when the tank lid is in the closed position; a plurality of sliding mechanisms attached to the tank lid; and a pair of guides attached to opposite sides of the tank opening flange, each of the pair of guides defines a track opening configured to receive the plurality of sliding mechanisms, the track opening configured to guide the plurality of sliding mechanisms and the tank lid around the tank opening flange.

In one example, further comprising: a pivotable mechanism operably attached to both of the tank lid and the tank opening flange to enable the tank lid to pivot about the tank opening flange.

In a second example, wherein the pivotable mechanism includes a clevis pin operably engaged with a clevis opening in the tank opening flange such that the clevis pin rotates in the clevis opening.

In a third example, wherein the sliding mechanisms include rollers that move along the track openings to a climax portion of the track openings such that the tank lid is in a raised position and the clevis pin is released from the clevis opening.

In a fourth example, wherein at least one of the rollers in the climax portion of the track opening includes at least one of the compression seals having cleared the tank opening flange.

In a fifth example, wherein the sliding mechanisms include rollers that move along the track openings to an end opening such that the tank lid is lower than a top of the tank opening flange and the tank opening is uncovered when the tank lid is in the open position.

In a sixth example, further comprising: a locking system configured to retain the tank lid in a locked position, the locking system is configured to operably engage and lift the tank lid away from the tank opening.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Some of the benefits of the present disclosure include reducing the number of components and simplifying closure assemblies on tank openings of pressurized supply tanks. The unique closure assemblies are configured to block dirt and debris from reaching any of the lid seals in the closure assemblies. The closure assemblies are arranged at foot level to the operator such that the operator can easily reach the opening and closing movements of a large heavy tank lid of the closure assemblies. The tank lid contains one or more seals on the underside, and when the tank lid is in the closed position the one or more seals rest on one or more tank opening flanges to provide a pressurized seal. In any position of movement of the tank lid from open to close or close to open positions, the one or more seals on the underside of the tank lid are not damaged when opening and closing the tank lid.

Figure 1:
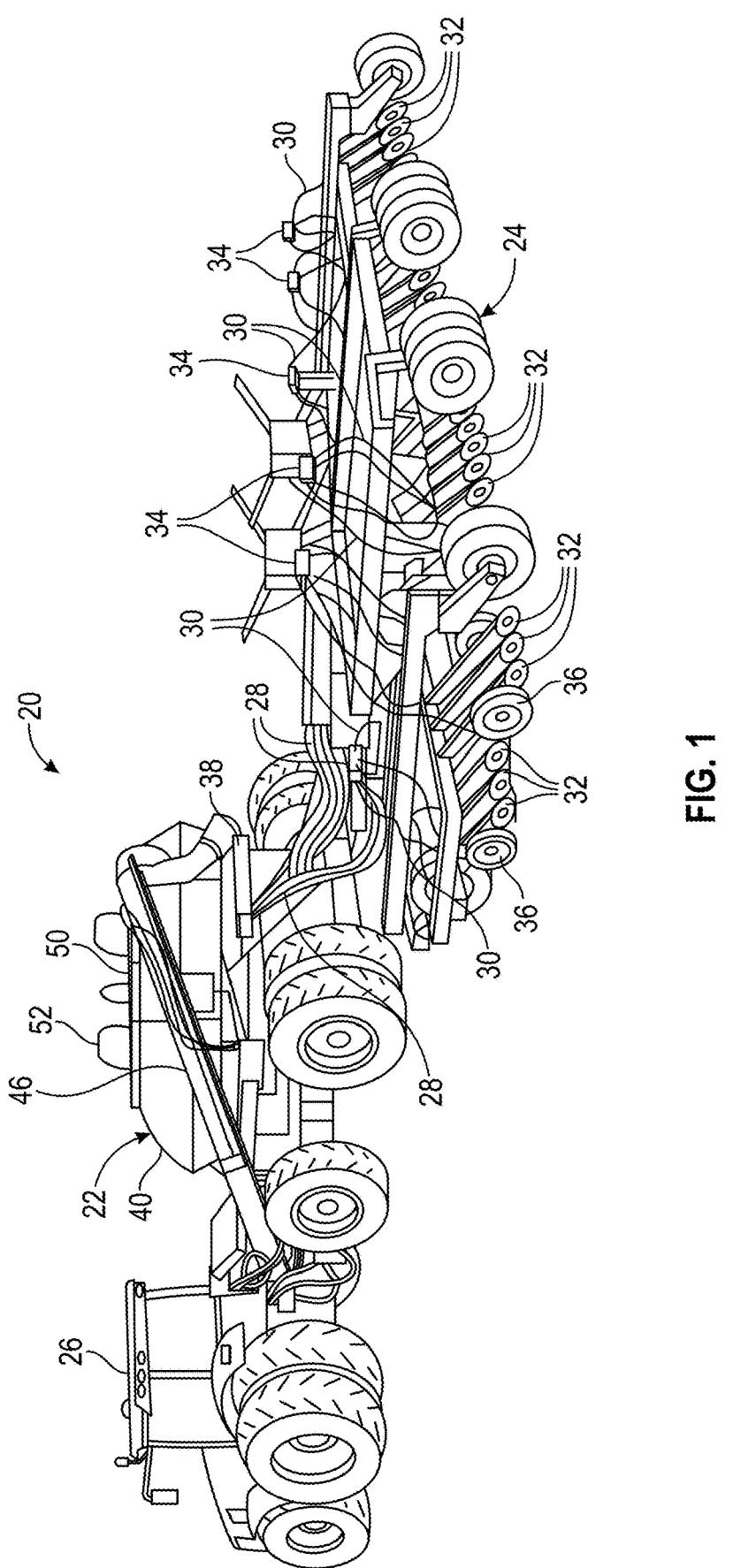
FIG. 1 is a perspective view of one embodiment of an air commodity dispersal (ACD) system including an ACD cart.

Referring now to FIG. 1, one embodiment of an air commodity dispersal ("ACD") ACD system 20, including an ACD cart 22 and a seeding machine 24, is illustrated. It is contemplated that other embodiments of the ACD system 20 may be utilized with the present disclosure. During operation, the ACD system 20 is pulled by a tractor 26 or otherwise moved across a field to distribute one or more agricultural commodities, such as seeds and fertilizer, held within the ACD cart 22. The agricultural commodities are carried by pressurized airstreams from the ACD cart 22 to the seeding machine 24, which then deposits or plants the commodities in the soil over which the ACD system 20 travels. A network of air conduits or plumbing lines 28, 30 conduct the commodity-entrained airstreams to a number of deposition tubes 32, which are arranged in different row units laterally spaced across the seeding machine 24. Additionally, a relatively small number of main air lines 28 may conduct the commodity-entrained airstreams from the ACD cart to a number of distribution towers 34 mounted to the seeding machine 24 at various locations. The distribution towers 34 may then divide the airstreams amongst a larger number of secondary air lines 30, which then convey the commodity to the deposition tubes 32 for planting or deposition within the ground. The row units of the seeding machine 24 may also include various ground-engaging tools 36, which assist in the commodity deposition process by, for example, opening furrows, packing soil, and closing furrows over the newly-deposited commodities.

Figure 2:
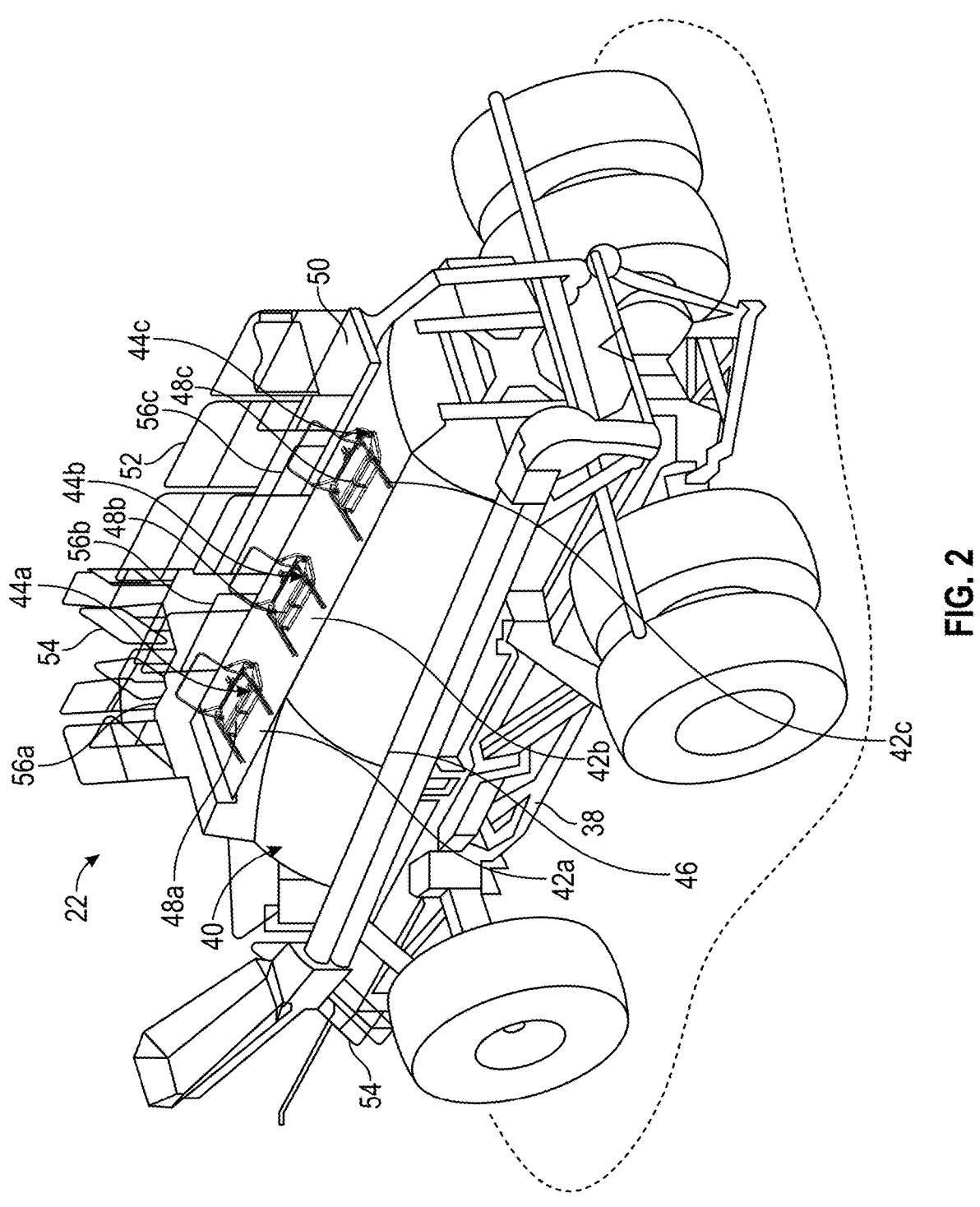
FIG. 2 is a perspective view of the ACD cart shown in FIG. 1 illustrating a number of closure assemblies installed around the openings of a pressurized supply tank.

Turning to FIG. 2, one embodiment of the ACD cart 22 is illustrated. Other embodiments of the ACD cart 22 may be utilized with the present disclosure. The ACD cart 22 includes a wheeled chassis or frame 38 on which one or more pressurized supply tanks are mounted, such as pressurized supply tank 40. The pressurized supply tank 40 may have multiple internally-partitioned compartments or "commodity chambers" each suitable for holding one or more types of agricultural commodities. A number of tank openings 42 are provided in pressurized supply tank 40 and each provide physical access to a corresponding commodity chamber within tank 40. Three such tank openings 42a-c are visible in FIG. 2 and spaced along the topside of pressurized supply tank 40. In further embodiments, the ACD cart 22 may include fewer or a greater number of the tank openings 42, which may provide access to any number of compartments or chambers contained within the pressurized supply tank 40. The tank openings 42 are often produced to be relatively large to permit commodities to be spread about the commodity chambers in a substantially even or distributed manner during filling. The tank openings 42 may vary size in conjunction with their corresponding commodity chambers, which may likewise vary in size depending upon the particular volume of commodity each chamber is intended to hold. As shown in FIGS. 1 and 2, the ACD cart 22 may be equipped with movable conveyor arm 46 to facilitate filling of the commodity chambers corresponding to the tank openings 42a-c.

Closure assemblies 44a-c are installed over the tank openings 42a-c, respectively. The closure assemblies 44 *a-c* include tank lids 48a-c, which are movable between closed and open positions. In the closed position, the tank lids 48a-c sealingly cover their respective tank openings 42a-c. The tank lids 48a-c are positioned along an elongated platform 50 extending above and along the length of the pressurized supply tank 40. The platform 50 is surrounded by a railing 52 and accessible utilizing a stairway 54 located adjacent the forward end of pressurized supply tank 40. The closure assemblies 44a-c further include handles 56a-c, respectively, which project upwardly from the tank lids 48a-c to allow an operator to move the lids 48a-c between their open 14 and closed positions while standing on the platform 50. Openings or gateways are provided in the railing 52 to provide access to the handles 56a-c.

The handle 56a will be described next however the handles 56b-c are similar to handle 56a. The handle 56a includes a pair of front linkages 57a that are operably connected to tank opening flanges 58a-b. The handle 56a includes a pair of hinged connections 69a that operably connect the handle 56a to the tank lid 48a. The handle 56a is operable between a closed position to an open position to lift the tank lid 48a and move the tank lid 48a along the pair of guides 300a-b.

The tank openings 42a-c may have relatively large planform dimensions to permit commodities to be spread about the commodity chambers in a substantially even or distributed manner during initial filling. The tank lids 48a-c are thus likewise imparted with relatively large planform dimensions equivalent to or greater than the corresponding dimensions of their respective tank openings 42a-c. During operation of the ACD cart 22, the commodity chambers are pressurized in conjunction with generation of the pressurized airstreams in which metered amounts of the commodities are entrained. The internal pressures created within the commodity chambers is typically about 2 pounds per square inch (about 14 kilopascal). Significant pressure loading forces may still be exerted on the interior of the tank lids 48a-c by the pressurized air within the commodity chambers, due to the relatively large surfaces of the tank lids 48a-c exposed to the elevated internal forces.

FIGS. 3-12 are detailed views of the closure assembly 44a illustrating the tank lid 48a in open and closed positions. As the closure assembly 44a is similar to the closure assemblies 44b and 44c shown in FIG. 2, the following description is equally applicable thereto. The closure assembly 44b includes a first pair of tank opening flanges 58a-b that extend to and connect with a second pair of tank opening flanges 58c-d wherein the first and second pair of tank opening flanges 58a-d extend around the periphery of the tank opening 42a.

The first opening flange 58c of the second pair of tank opening flanges 58c-d is configured to receive a locking system 100 thereon. The first opening flange 58c includes a pair of extension legs 71a that are separated a distance from each other. Each of the extensions legs 71a includes one or more mounting holes 73a to receive cross bars, fasteners, bolts, or other components from the locking system 100 to mount the locking system 100 to the first opening flange 58c.

Figure 10:
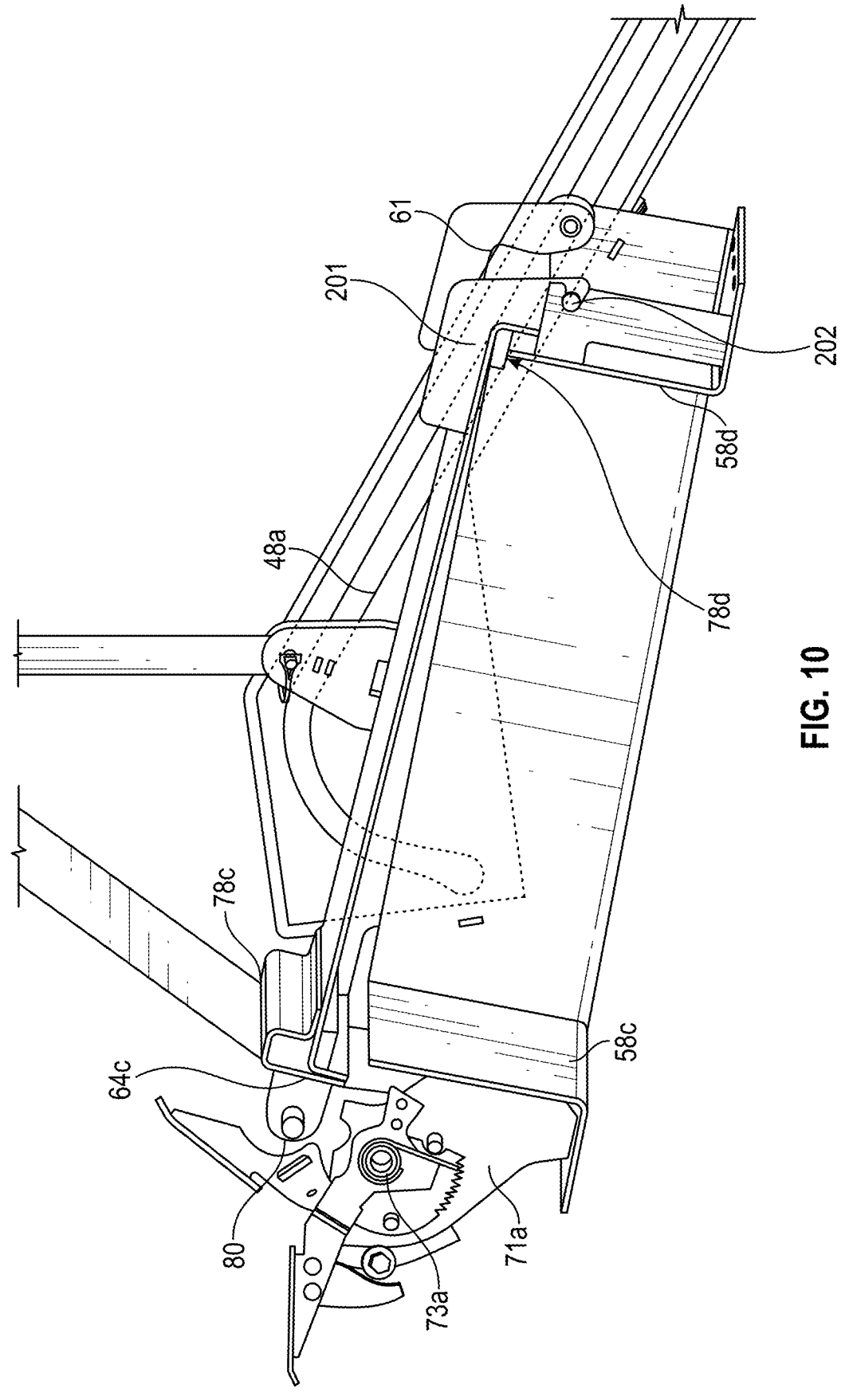
FIG. 10 is a cross-sectional view of the closure assembly of FIG. 2 in a partially open position.
Figure 11:
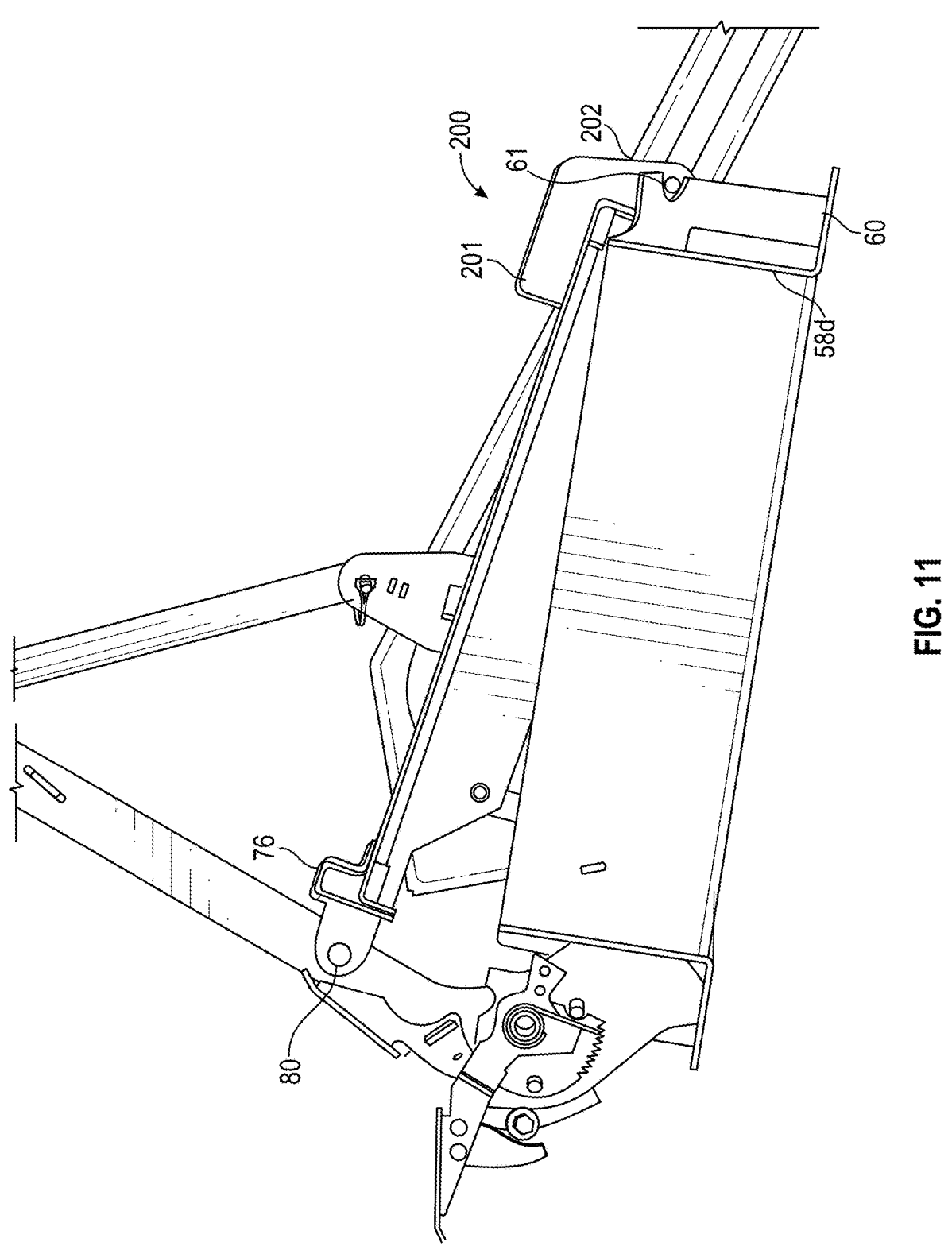
FIG. 11 is a cross-sectional view of the closure assembly of FIG. 2 in a raised position.
Figure 12:
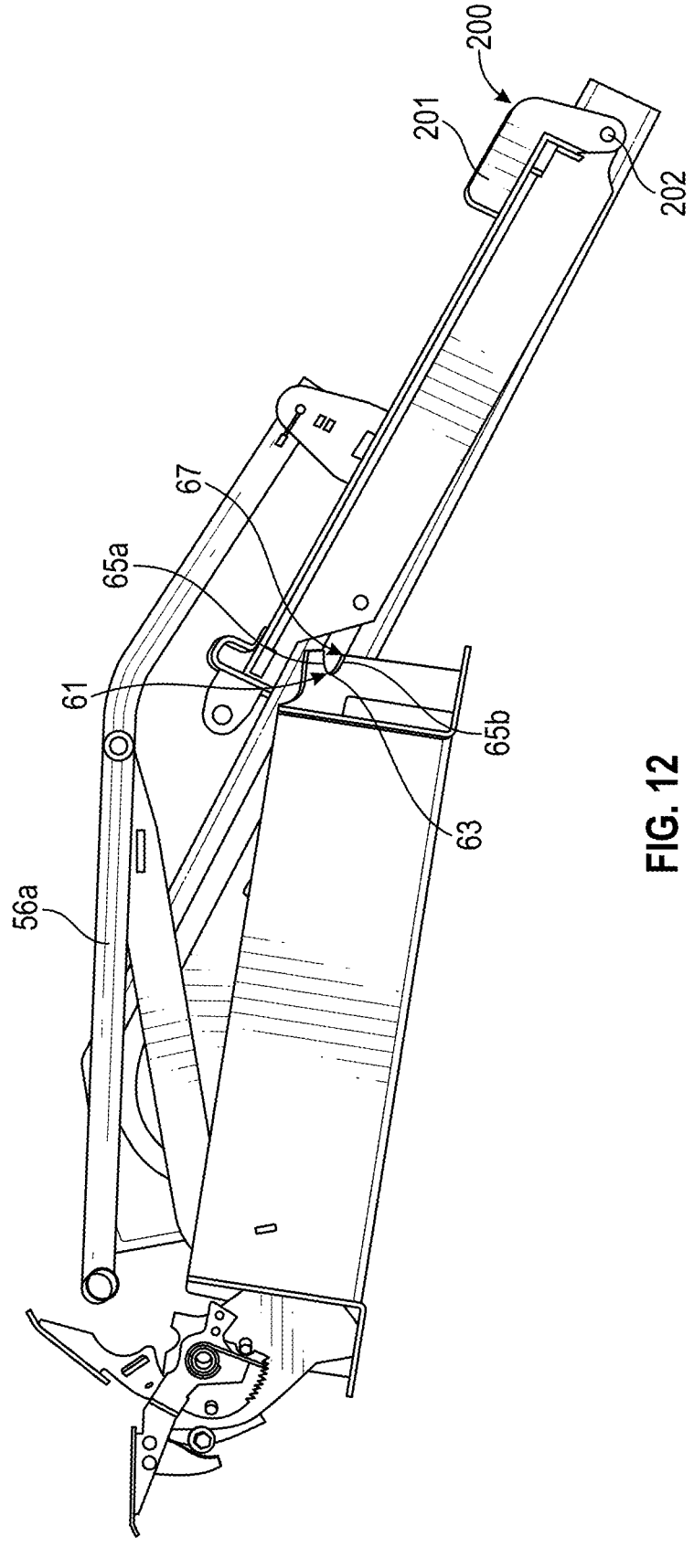
FIG. 12 is a side view of the closure assembly of FIG. 2 in the open position.

The second opening flange 58d of the second pair of tank opening flanges 58c-d is configured to engage a clevis mechanism 200 that extends from the tank lid 48a. The clevis mechanism 200 includes a clevis leg 201 having a generally "L" shape with a horizontal portion attached to the cover 62 of the tank lid 48a, and the clevis leg 201 has a vertical portion the extends vertically downwardly to a clevis pin 202 attached thereto. The second opening flange 58d includes a leg 60 that includes a clevis opening 61 sized to receive the clevis pin 202 from the clevis leg 201. The clevis leg 201 is configured and sized to align the clevis pin 202 in the clevis opening 61 when the tank lid 48a is in the closed position. The clevis opening 61 is configured to enable rotation of the clevis pin 202 when the tank lid 48a is in a partially open position as illustrated in FIG. 10. The clevis opening 61 is configured to enable the clevis pin 202 to move away from the clevis opening 61 and begin exiting the clevis opening 61 when the tank lid 48a is in a raised position as illustrated in FIG. 11. The clevis opening 61 is configured to enable the clevis pin 202 to fully exit the clevis opening 61 when the tank lid 48a is in the open position as illustrated in FIG. 12. The clevis opening 61 has a semicircular portion 63 that extends to a first and a second clevis ramp 65a-b. The second clevis ramp 65b also forms a lip 67 upon which the clevis pin 202 may engage when the tank lid 48a is moved from the fully open position to the closed position. The clevis pin 202 may not engage the lip 67 but instead enter the clevis opening 61 thereby avoiding the lip 67. The opening and closing of the tank lid 48a is described in more detail below.

The tank lid 48a includes a cover 62 that is sized to cover or enclose the tank opening 42a formed by the first and second pair of tank opening flanges 58a-d. The cover 62 is generally rectangular in shape, however in other embodiments the cover 62 may be shaped differently. The tank lid 48a includes a first pair of lid flanges 64a-b that extend to and connect with a second pair of lid flanges 64c-d wherein the first and second pair of lid flanges 64*a-d* extend around and exteriorly to the first and second pair of tank opening flanges 58*a-d* when the tank lid 48*a* is in a 6 closed position. The first and second pair of lid flanges 64*a-d* also extend vertically downwardly from the cover 62 along their corresponding first and second pair of tank opening flanges 58*a-d* when the tank lid 48*a* is in a closed position.

In the illustrated embodiment, the tank lid 48*a* also includes a locking rail 76 mounted on the cover 62 and above the lid flange 64*a* wherein the locking rail 76 is configured to receive one or more components from a locking system 100 as described in more detail below. In one form, the locking rail 76 includes a bar 80 that is configured to engage the locking system 100. In other embodiments, the bar 80 is configured differently but still operates to engage the locking system as one of ordinary skill in the art would appreciate. The locking rail 76 generally extends in an upward direction away from the cover 62. The locking rail 76 has a rectangular cross-sectional shape but may be shaped differently in other embodiments. Moreover, in other embodiments, the tank lid 48*a* may not include the locking rail 76 and instead the lid flange 64*c* is configured to engage the locking system 100.

The tank lid 48*a* includes a first pair of compression seals 78*a-b* (not illustrated) that are sized and attached to an underside 79 of the cover 62 along the first pair of lid flanges 64*a-b*. The tank lid 48*a* includes a second pair of compression seals 78*c-d* that are sized and attached to the underside 79 of the cover 62 along the second pair of lid flanges 64*c-d*. The compression seals 78*a-d* cooperate with the first and second pair of tank opening flanges 58*a-d* to produce a 360 degree seal between the tank lid 48*a* and the tank opening 42*a*. The compression seals 78*a-d* May be integrally formed as a single (e.g., molded) piece, which forms a complete rectangle or ring having a planform shape generally conforming to the shape of the tank lid 48*a*. Alternatively, the compression seals 78*a-d* may be produced as discrete pieces or seals, which are separately affixed to the first and second pairs of lid flanges 64*a-d*, respectively. The compression seals 78*a-d* may be a cast urethane seal, or other materials, which is glued, bolted, or otherwise attached to the tank lid 48*a*. The compression seals 78*a-d* may be rectangular in cross-sectional shape or have other shapes, compositions, and may be attached to the tank lid 48*a* in other manners. Additionally, in further embodiments, multiple compression seals may be utilized.

The tank lid 48*a* also includes a pair of front rollers 90*a-b* and a pair of rear rollers 92*a-b* wherein the front and rear rollers 90*a* and 92*a* are attached to and located on the lid flange 64*a* and the front and rear rollers 90*b* and 92*b* are attached to and located on the lid flange 64*b*. The pairs of front and rear rollers 90*a-b* and 92*a-b* are configured to slide along a pair of guides 300*a-b*.

The closure assembly 44*a* also includes a pair of guides 300*a-b* wherein the guide 300*a* is attached to the tank opening flange 58*a* and the guide 300*b* is attached to the tank opening flange 58*b*. The guide 300*a* includes a track opening 302*a* and the guide 300*b* includes a track opening 302*b*. Track opening 302*a* is substantially identical to the track opening 302*b* therefore only track opening 302*b* will be described. Track opening 302*b* extends along a length of the guide 300*b* wherein the track opening 302*b* includes a first end opening 304*b* and a clearance window 314*b* that corresponds to the tank lid 48*a* being in the closed position. In the closed position, the front roller 90*b* rests in the first end opening 304*b* and the rear roller 92*b* rests in the clearance window 314*b*. The track opening 302*b* includes a second end opening 306*b* that corresponds to the tank lid 48*a* being in the open position. The track opening 302*b* includes an arc portion 308*b* that engages the first end opening 304*b* and generally forms an angle A relative to a vertical reference line. The angle A is typically between 0 and 45 degrees but can be larger than 45 degrees in other embodiments. The arc portion 308*b* may be curved or straight. The arc portion 308*b* has a length that corresponds to raising the tank lid 48*a* to the raised position such that the compression seal 78*d* is decompressed as the tank lid 48*a* lifts away from the tank opening flange 58*d*. The track opening 302*b* includes a climax portion 310*b* that is tangent along the arc portion 308*b* and is the highest peak that the front roller 90*b* will travel along the track opening 302*b*. When the front roller 90*b* is in the climax portion 310*b*, the compression seal 78*d* has cleared the tank opening flange 58*d* such that the compression seal 78*d* is not damaged as the tank lid 48*a* slides up and over the tank opening flange 58*d*. The track opening 302*b* includes a runner portion 312*b* that extends from the climax portion 310*b* to the second end opening 306*b*. The runner portion 312*b* forms an angle B relative to a horizontal reference line wherein the angle B is typically between 10 to 45 degrees but may be larger in other embodiments. The runner portion 312*b* has a length that substantially corresponds to the length of tank opening flange 58*b* such that when the tank lid 48*a* is in the open position the agricultural commodity can be placed in the tank opening 42*a* without touching the tank lid 48*a* and the tank lid 48*a* does not block any portion of the tank opening 42*a*.

The operation from an open to closed positioned of the closure assemblies 44*a-c* will now be described with reference to the closure assembly 44*a* as closure assemblies 44*b-c* operate in a similar fashion. The operator uses the handle 56*a* to move the tank lid 48*a* from the open to closed positions, and from the closed to open positions. From the closed position illustrated in FIG. 9 to a partially open position as illustrated in FIG. 10, the operator engages the locking system 100 to release the tank lid 48*a* such that the compression seal 78*c* and the compression seal 78*d* are decompressed. Also illustrated in FIG. 10 is the tank lid 48*a* and the lid flange 64*c* that is raised above the tank opening flange 58*c* as the clevis pin 202 pivots or rotates in the clevis opening 61 such that the tank lid 48*a* is now propped open a few degrees from the closed position. As the front rollers 90*a-b* move along the arc portions 308*a-b* to the climax portions 310*a-b* and the tank lid 48*a* is in the raised position illustrated in FIG. 11, the clevis pin 202 is released from the clevis opening 61. The tank lid 48*a* follows an arc motion along the arc portions 308*a-b* until the front rollers 90*a-b* reach the climax portions 310*a-b* such that the tank lid 48*a* is raised partially above the tank opening flange 58*b*. The compression seal 78*d* has rotated and cleared or moved past the tank opening flange 58*d*. As the front rollers 90*a-b* continue to move from the climax portions 310*a-b* along the length of the runner portions 312*a-b*, the tank lid 48*a* follows a linear downward motion to clear the tank opening 42*a*. As the front rollers 90*a-b* move along the runner portions 312*a-b* to the second end opening 306*b*, generally the tank lid 48*a* is lower than the top of the tank opening flanges 58*a-d* to allow clearance for filling the corresponding commodity chamber within tank 40 and visibility of filling from ground level. To move the tank lid 48*a* from the open position in FIG. 12 to the raised position in FIG. 11, i.e., to begin to partially close the tank lid 48*a*, the tank lid 48*a* slides along the track openings 302*a-b* with the compression seal 78*d* raised above the tank opening flange 58*d* until the clevis pin 202 makes contact with the lip 67 on the second clevis ramp 65b and the compression seal 78d makes contact with the tank opening flange 58d. From the raised position in FIG. 11 to the partially open position in FIG. 10, the travel motion of the tank lid 48a changes to an arc motion as the front rollers 90a-b travel along the arc portions 308a-b. When the front rollers 90a-b reach the first end openings 304a-b, the tank lid 48a is in the closed position illustrated in FIG. 9 and the compression seal 78c engages the tank opening flange 58c and the remaining compression seals 78a,b,d engage their respective tank opening flange 58a,b,d. The operator engages the locking system 100 to lock the tank lid 48a into the closed position.

Referring now to FIGS. 9-12 and FIGS. 13-19, the locking system 100 will now be described with reference to the closure assembly 44a. The locking system 100 is one embodiment that can be used with the closure assembly 44a, however other forms of the locking systems can be used with the closure assembly 44a. The locking system 100 retains the tank lid 48a in a closed position until the locking system 100 is activated. Once the locking system 100 is activated, such as by an operator, the locking system 100 releases from the tank lid 48a and the locking system 100 engages the tank lid 48a to lift the tank lid 48a into a slightly open position as illustrated in FIG. 10. Thereafter the operator uses the handle 56a to move the tank lid 48a into the fully opened position.

Figure 9:
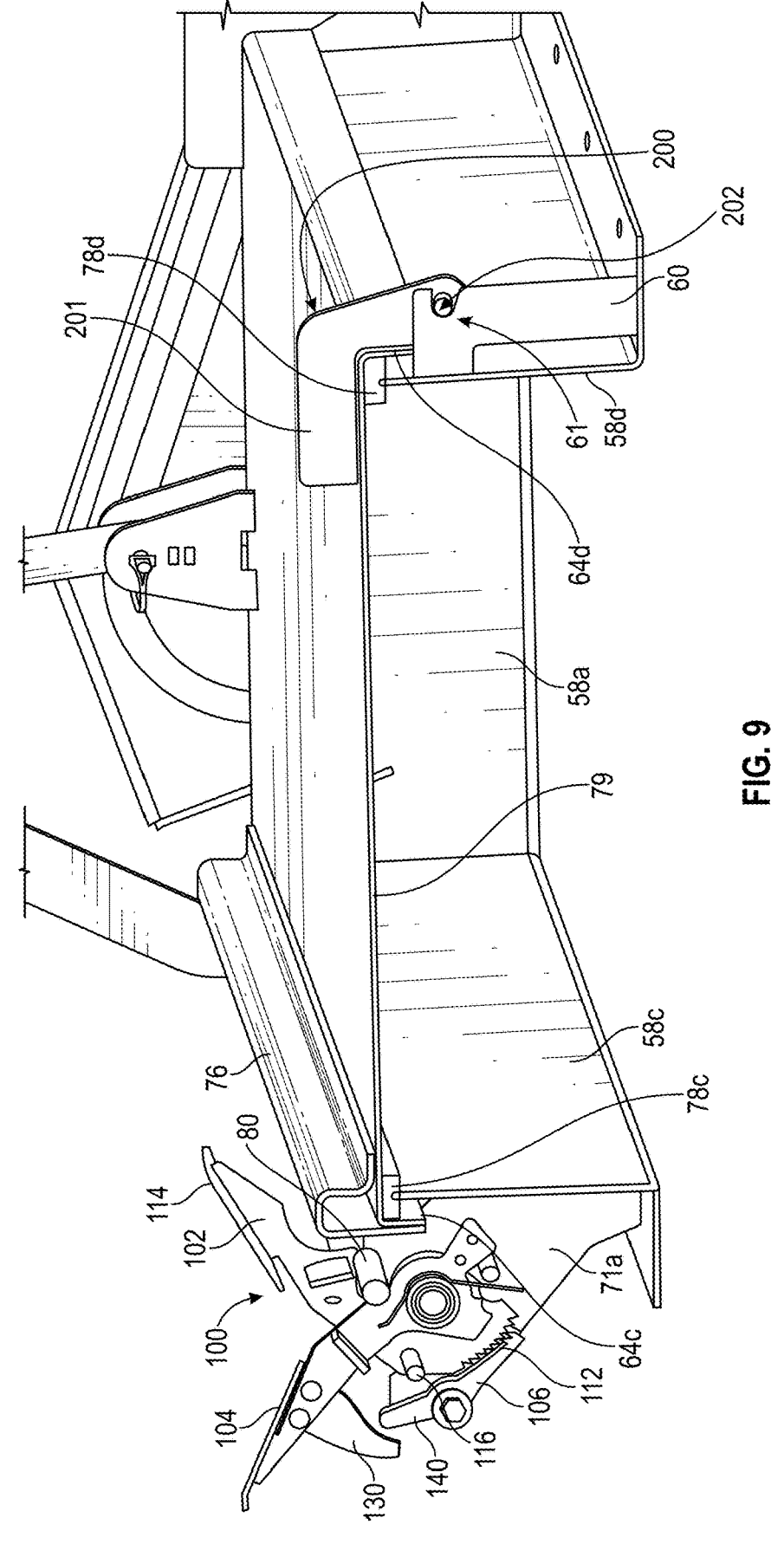
FIG. 9 is a cross-sectional view of the closure assembly of FIG. 2 in the closed position.
Figure 13:
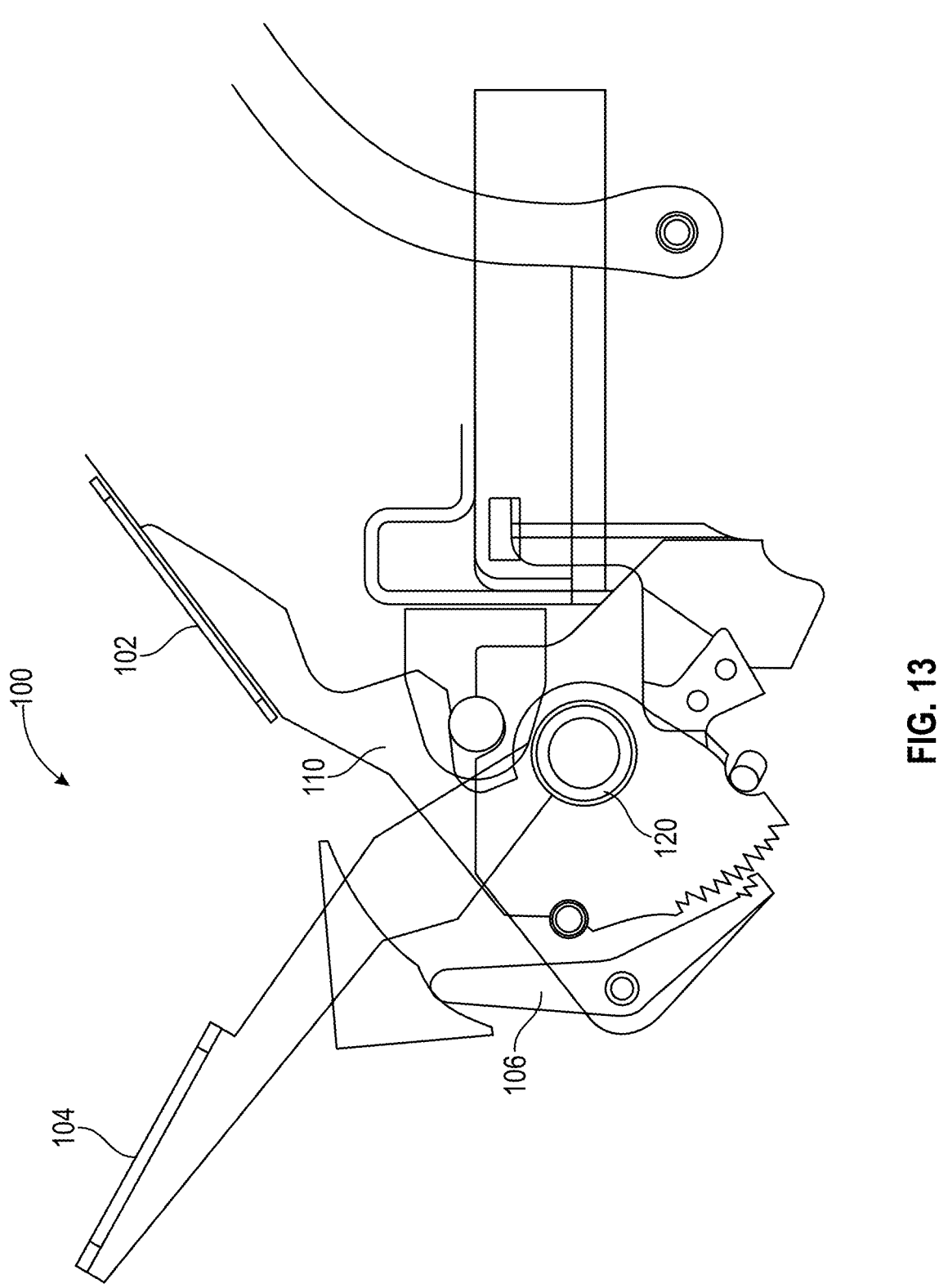
FIG. 13 is a side view of one embodiment of a locking system for use with the closure assembly of FIG. 2.

The locking system 100 includes a first foot pedal 102, a second foot pedal 104, and a locking pawl 106. The first foot pedal 102 includes a cam shape latch 110 that engages the bar 80 to lock the tank lid 48a in a closed position as illustrated in FIGS. 9 and 13. The first foot pedal 102 includes an engagement portion 112 to engage and retain the locking pawl 106 in the closed position. The engagement portion 112 includes one or more teeth 113 configured to engage the locking pawl 106. The first foot pedal 102 includes a foot engagement portion 114 that is shaped to receive an operator's foot thereon and operates as a lever to push the cam shape latch 110 into engagement with the bar 80 as the first foot pedal 102 rotates about a rotation axis or pivot 120 to lock the tank lid 48a closed. The first foot pedal 102 includes a bump stop 116 that spans between a first leg 122 and a second leg 124 of the first foot pedal 102.

The second foot pedal 104 includes an engagement portion 130 to engage the locking pawl 106 and maintain the locking pawl 106 in the closed position. The second foot pedal 104 includes a foot engagement portion 132 that is shaped to receive an operator's foot thereon. The second foot pedal 104 includes a pair of legs 134 that are configured to engage a cam 136 that extends from the extension legs 71a wherein the pair of legs 134 rotate to engage the cam 136 to stop the second foot pedal 104 from further rotation. The second foot pedal 104 includes a kicker portion 138 that engages the bump stop 116 of the first foot pedal 102. The second foot pedal 104 rotates about the rotation axis or pivot 120.

The locking pawl 106 includes a release portion 140 opposite a locking portion 142 wherein the release portion 140 is separated from the locking portion 142 by a rotational axis 144 about which the locking pawl 106 rotates. In one form, the locking pawl 106 rotates from an angle of about 47 degrees to an angle of about 33.5 degrees for a net angle movement of about 14 or 15 degrees. The release portion 140 is configured to engage the engagement portion 130. The locking portion 142 includes one or more teeth 146 to engage the one or more teeth 113 on the engagement portion 112 of the first foot pedal 102. The cam shape latch 110 along with the one or more teeth help to keep the first foot pedal 102 in a home or closed position as the pressure in tank will apply a large force to the underside of the lid. The locking pawl 106 also provides a "click" giving 6 the operator an indication that the locking pawl 106 is set. The locking pawl 106 is attached to the extension legs 71a at the rotational axis 144 with a bolt or other fastener 150 through one of the mounting holes 73a.

Figure 3:
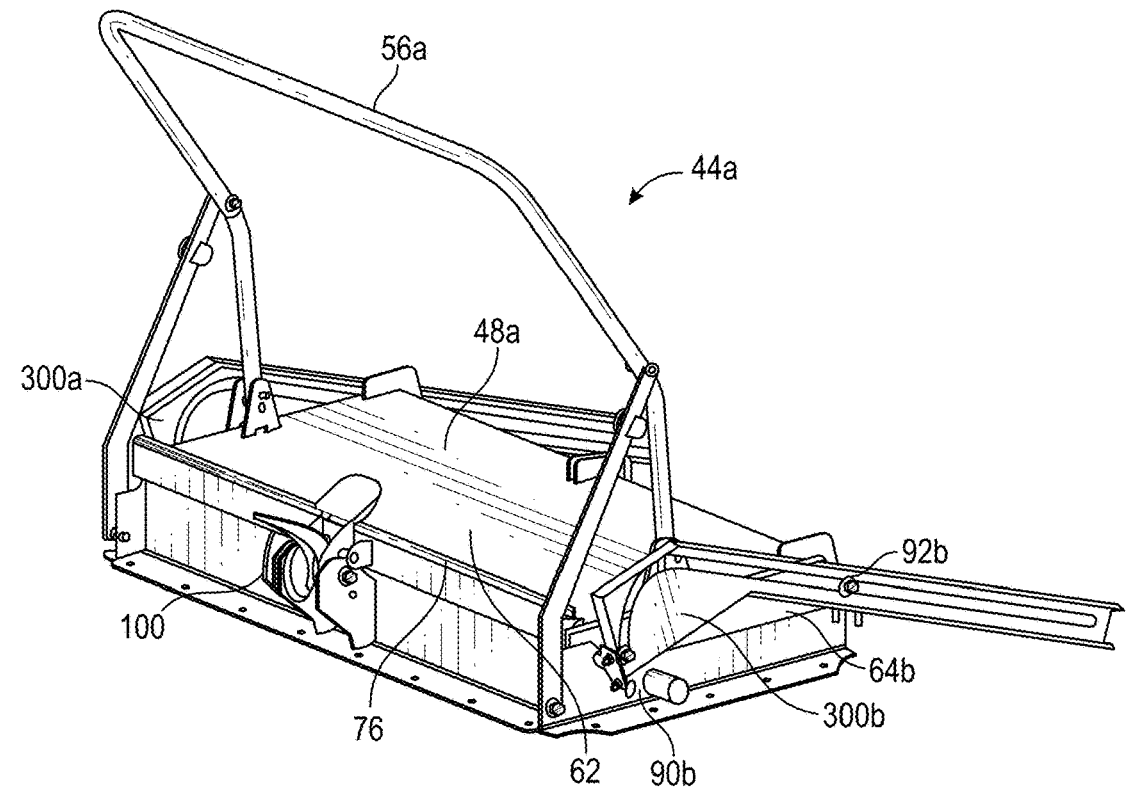
FIG. 3 is a top perspective view of one of the closure assemblies shown in FIG. 2 in a closed position.
Figure 4:
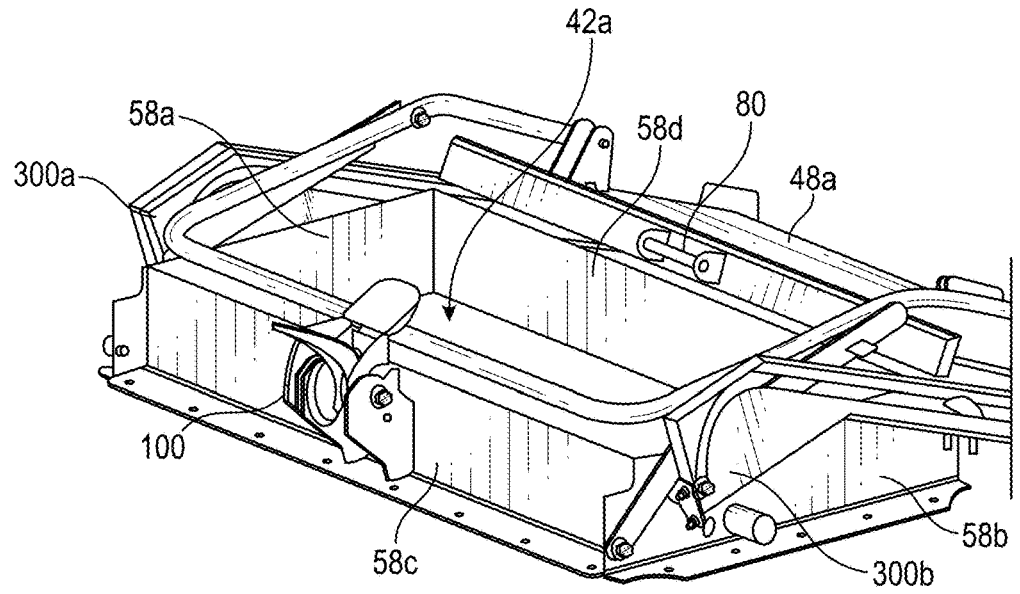
FIG. 4 is a top perspective view of the closure assembly of FIG. 2 in an open position.
Figure 5:
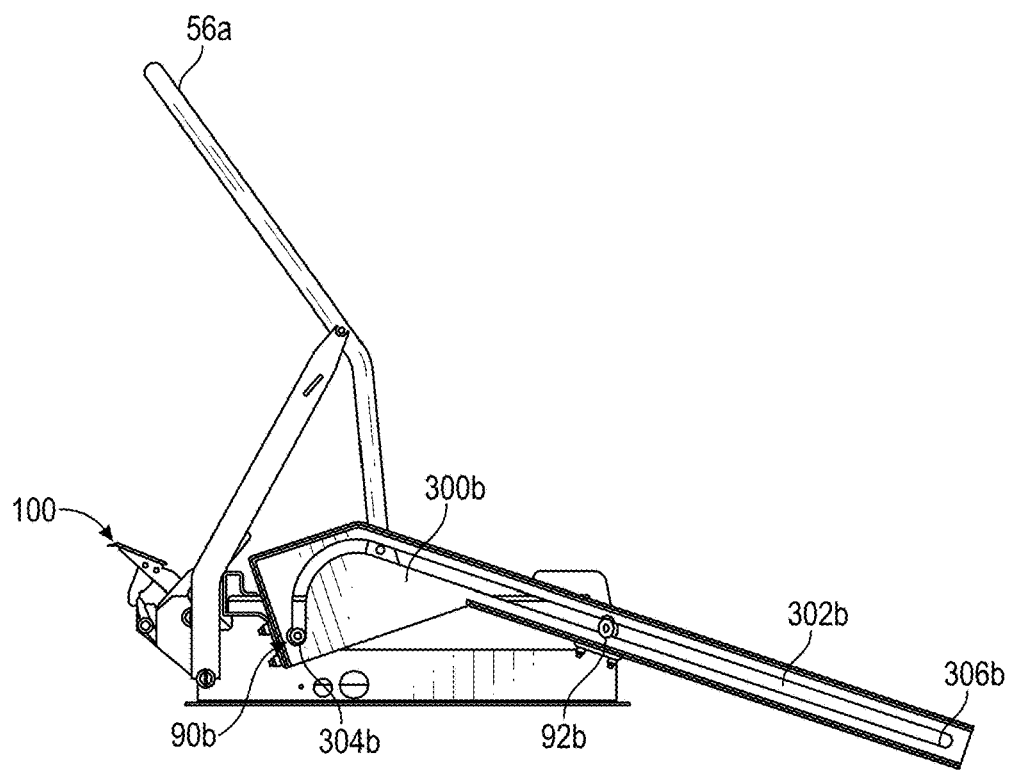
FIG. 5 is a side view of the closure assembly of FIG. 2 in the closed position.
Figure 6:
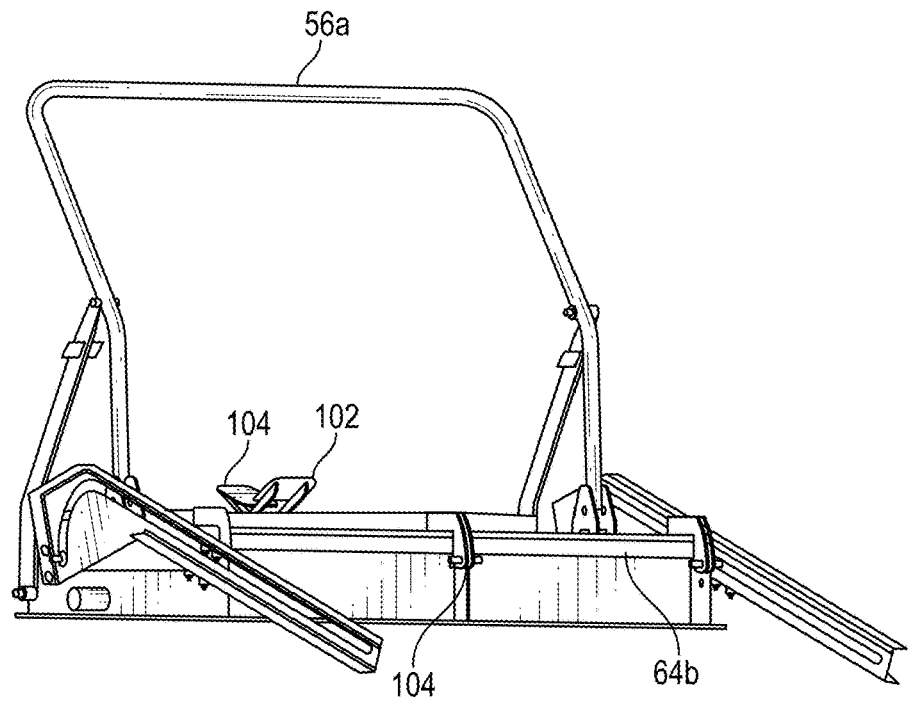
FIG. 6 is a rear view of the closure assembly of FIG. 2 in the closed position.
Figure 7:
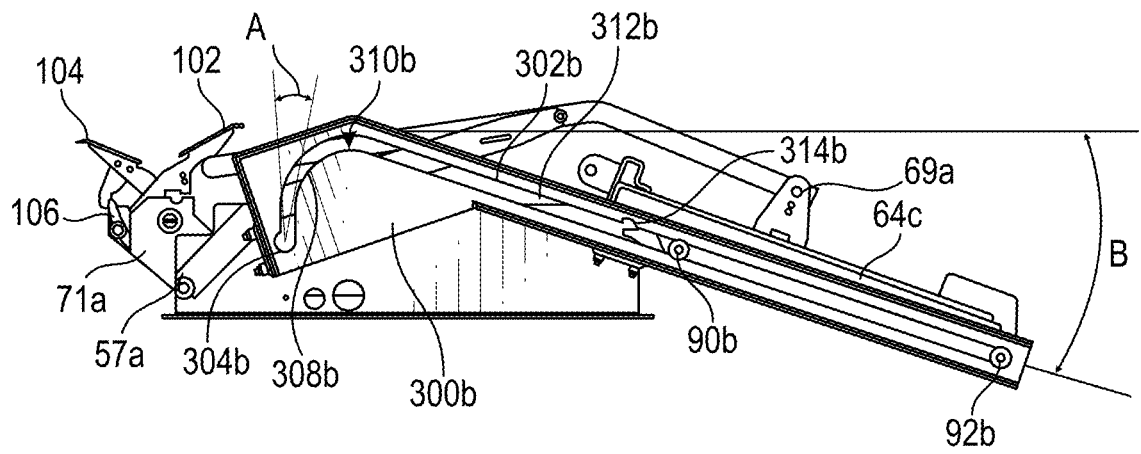
FIG. 7 is a side view of the closure assembly of FIG. 2 in the open position.
Figure 8:
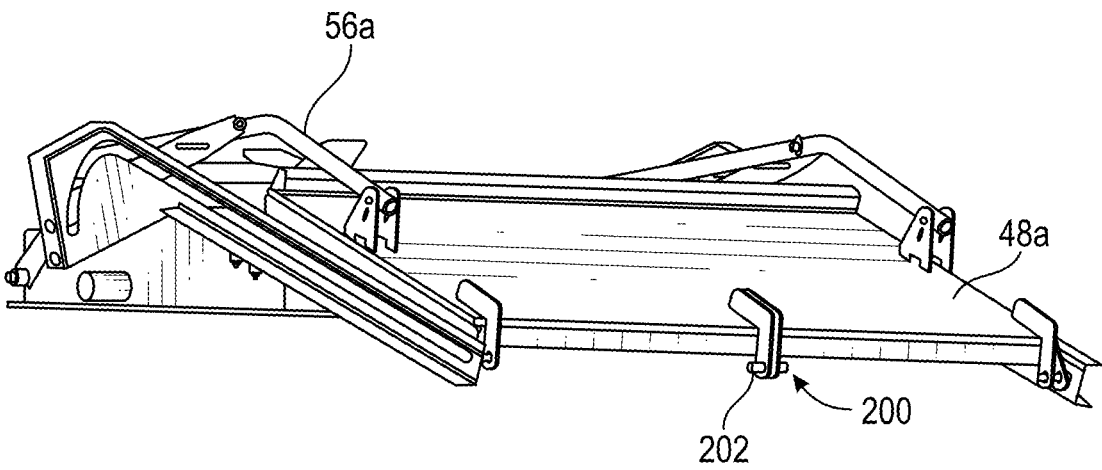
FIG. 8 is a rear view of the closure assembly of FIG. 2 in the open position.
Figure 17:
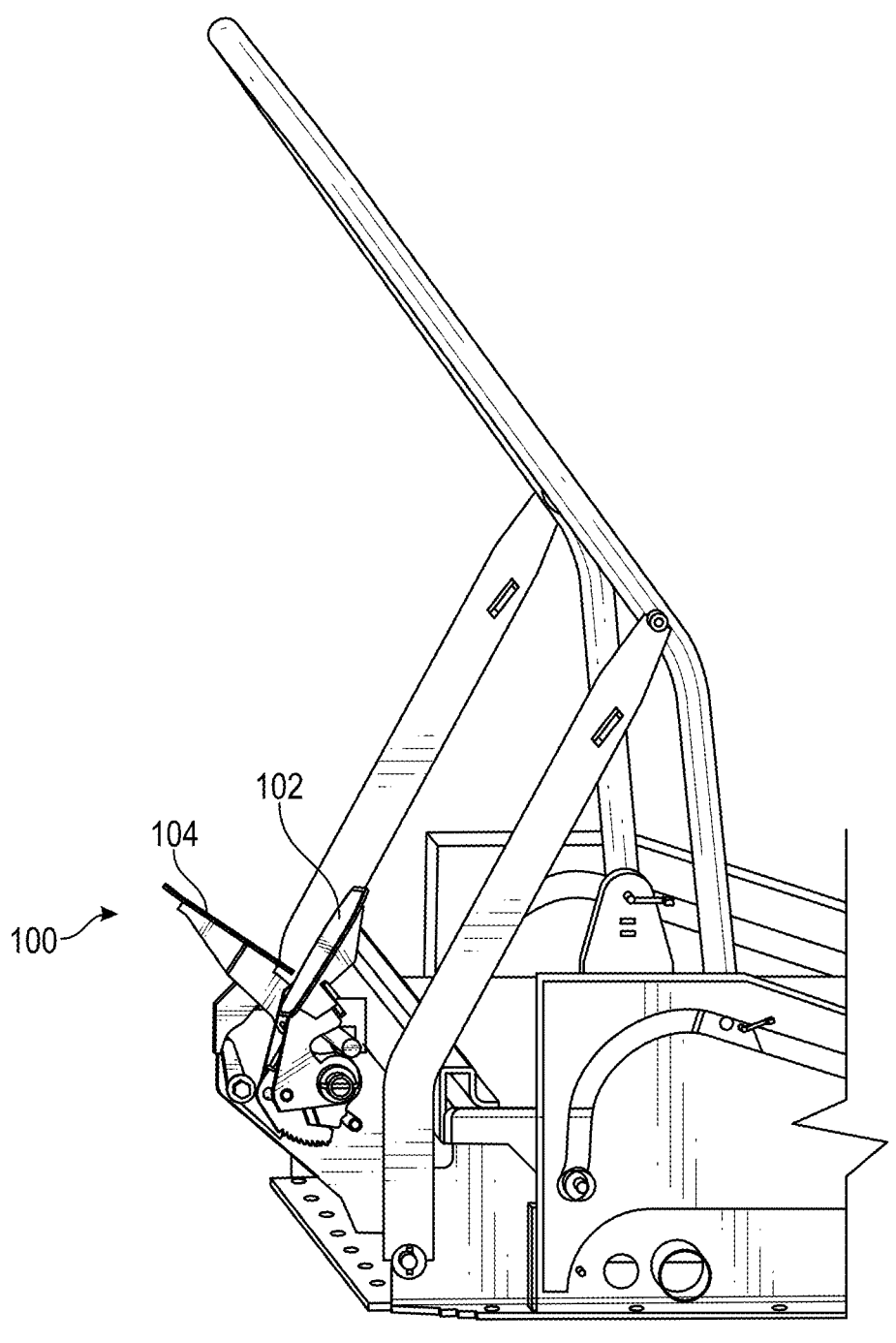
FIG. 17 is a top perspective view of the locking system of FIG. 13.
Figure 19:
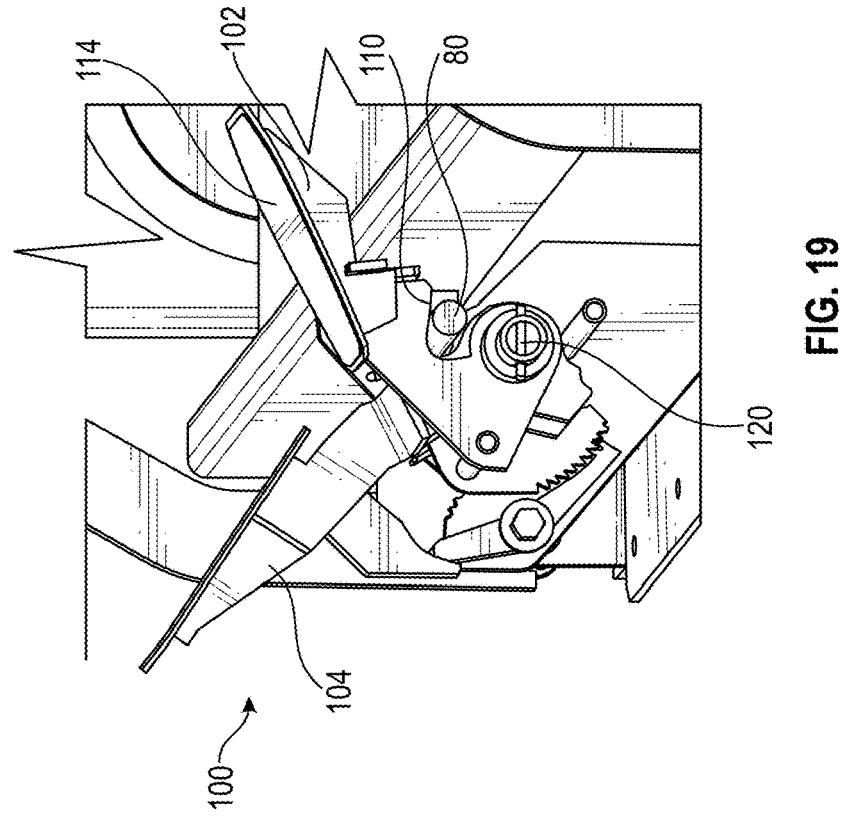
FIG. 19 is a top perspective view of the locking system of FIG. 13.
Figure 18:
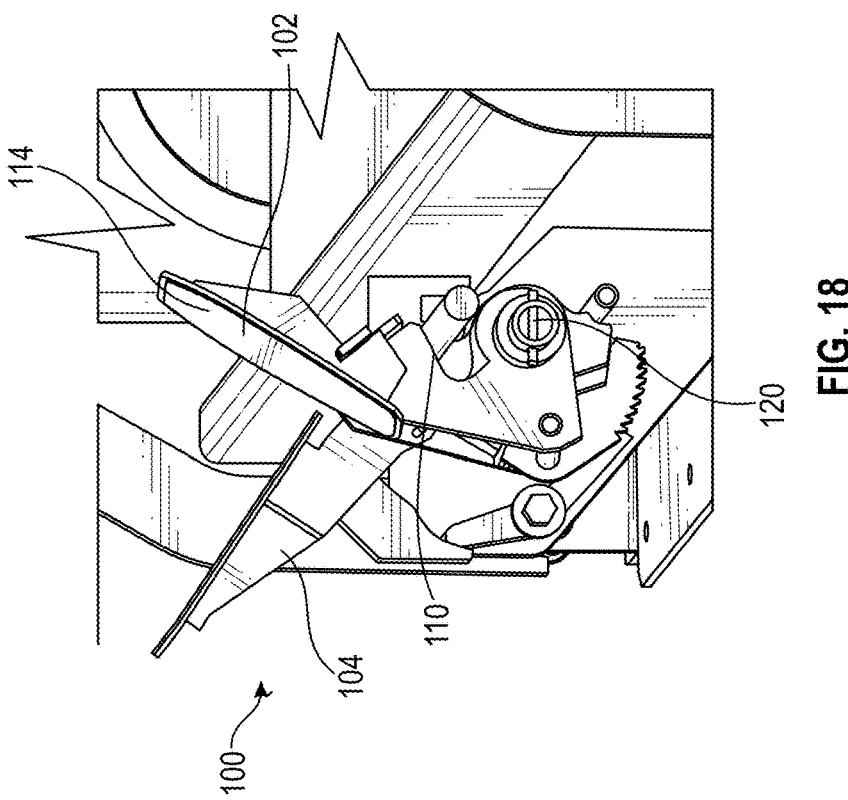
FIG. 18 is a top perspective view of the locking system of FIG. 13.

To lock the locking system 100 onto the tank lid 48a, the tank lid 48a is closed onto the tank opening 42a such as illustrated in FIGS. 3 and 17. The first foot pedal 102 and the second foot pedal 104 are in the home position as illustrated in FIG. 17. The home position is defined as the tank lid 48a resting on the tank opening flanges 58a-d, and the first and second foot pedals 102 and 104 in an upright position. To lock the tank lid 48a onto the tank opening 42a, an operator engages the foot engagement portion 114 of the first foot pedal 102 and presses the foot engagement portion 114 downward so that the foot engagement portion 114 rotates clockwise about the rotation axis or pivot 120 until the cam shape latch 110 engages the bar 80 to lock the tank lid 48a in a closed position as illustrated in FIGS. 18 and 19. In one form, the first foot pedal 102 rotates from an angle of about 64 degrees to an angle of about 28 degrees for a net angle movement of 36 degrees.

Figure 14:
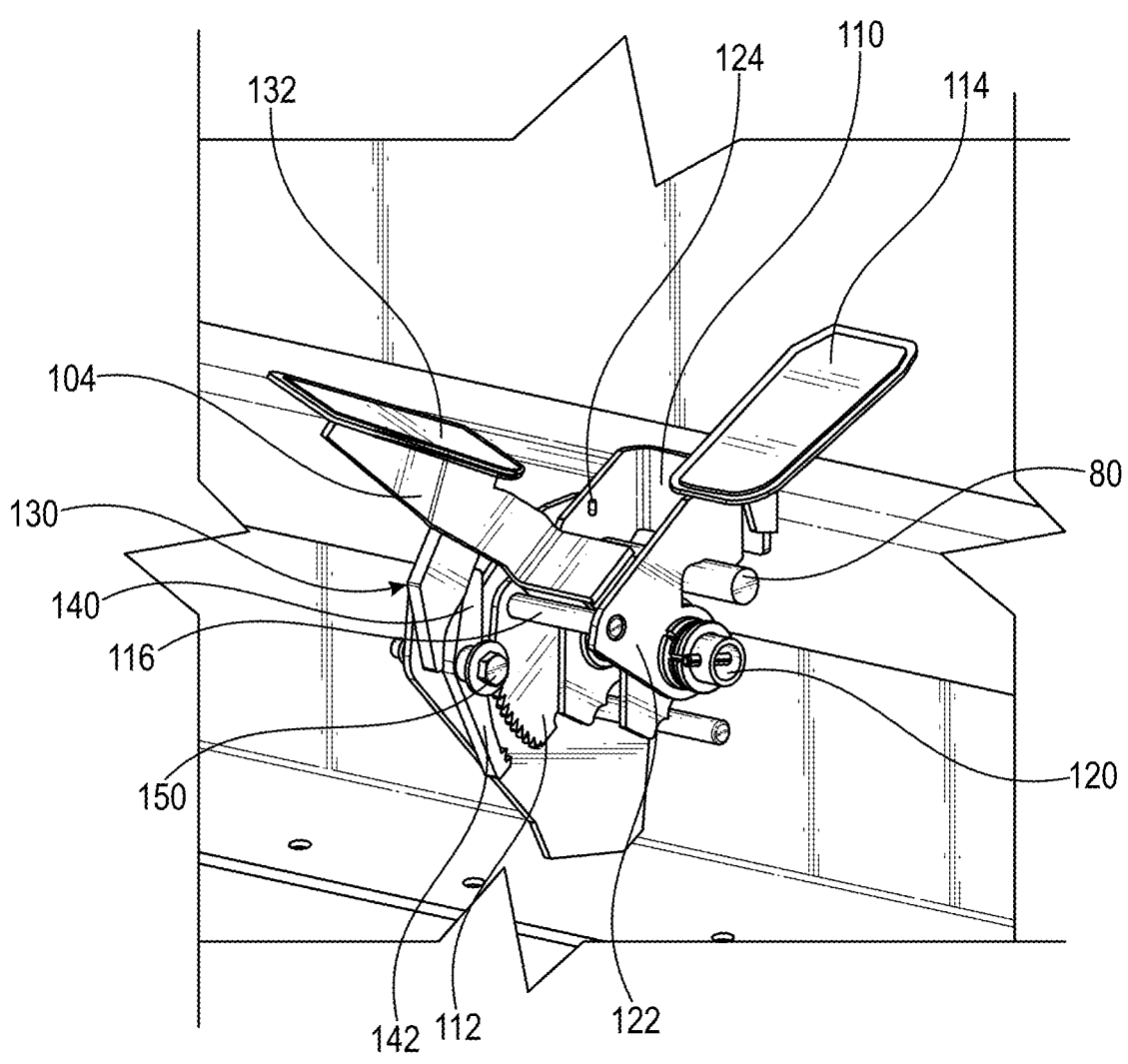
FIG. 14 is a top perspective view of the locking system of FIG. 13.

In FIG. 14, the operator engages the foot engagement portion 132 of the second foot pedal 104 to cause the second foot pedal 104 to rotate counterclockwise about the rotation axis or pivot 120 such that the engagement portion 130 engages the release portion 140 of the locking pawl 106 and causes the locking pawl 106 to rotate about the rotational axis 144 and bolt or other fastener in a clockwise direction to release the locking pawl 106 from the engagement portion 112 of the first foot pedal 102. In one form, the second foot pedal 104 rotates from an angle of about 106 degrees to an angle of about 70 degrees for a net angle movement of 36 degrees.

Figure 15:
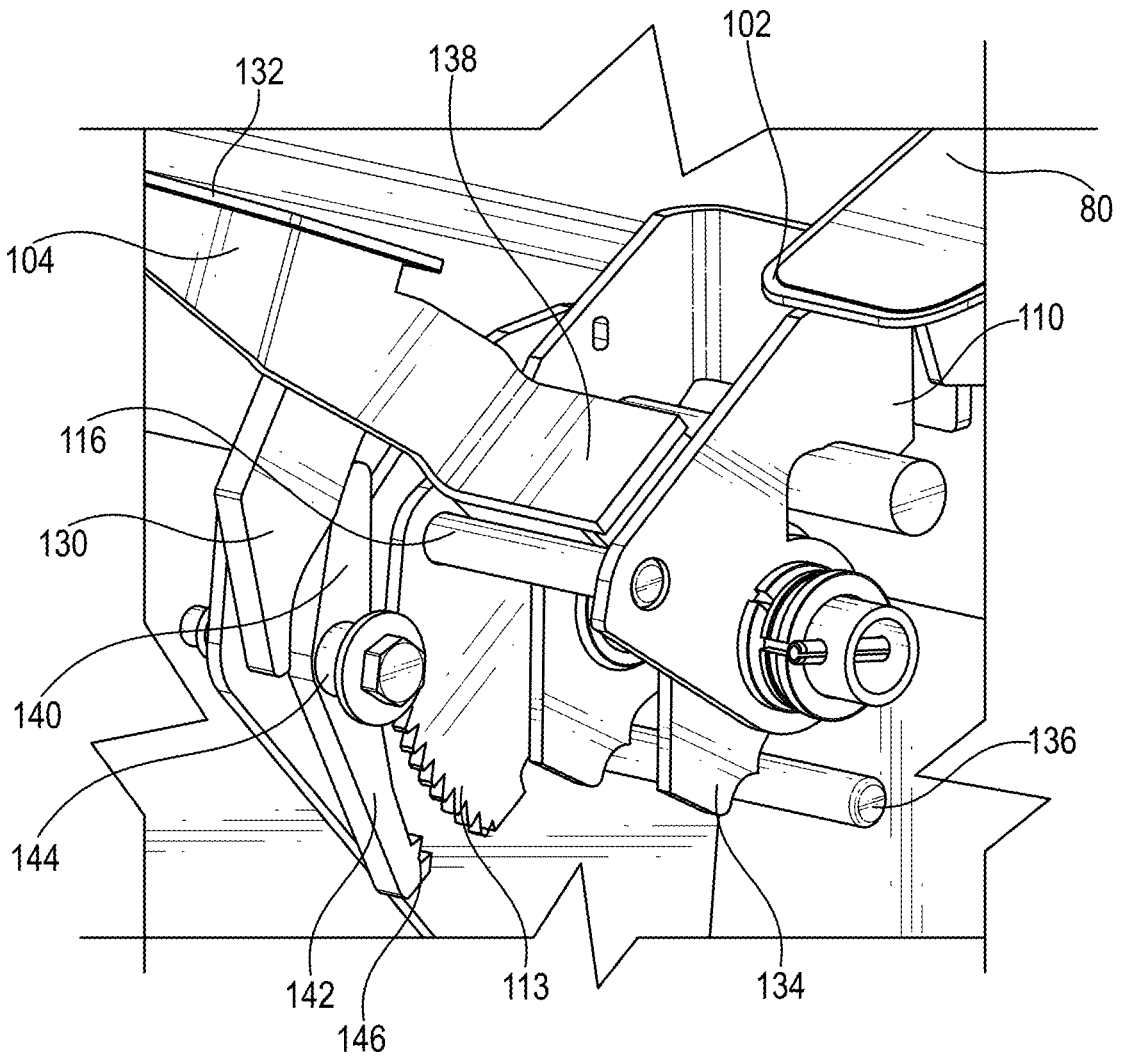
FIG. 15 is a top perspective view of the locking system of FIG. 13.
Figure 16:
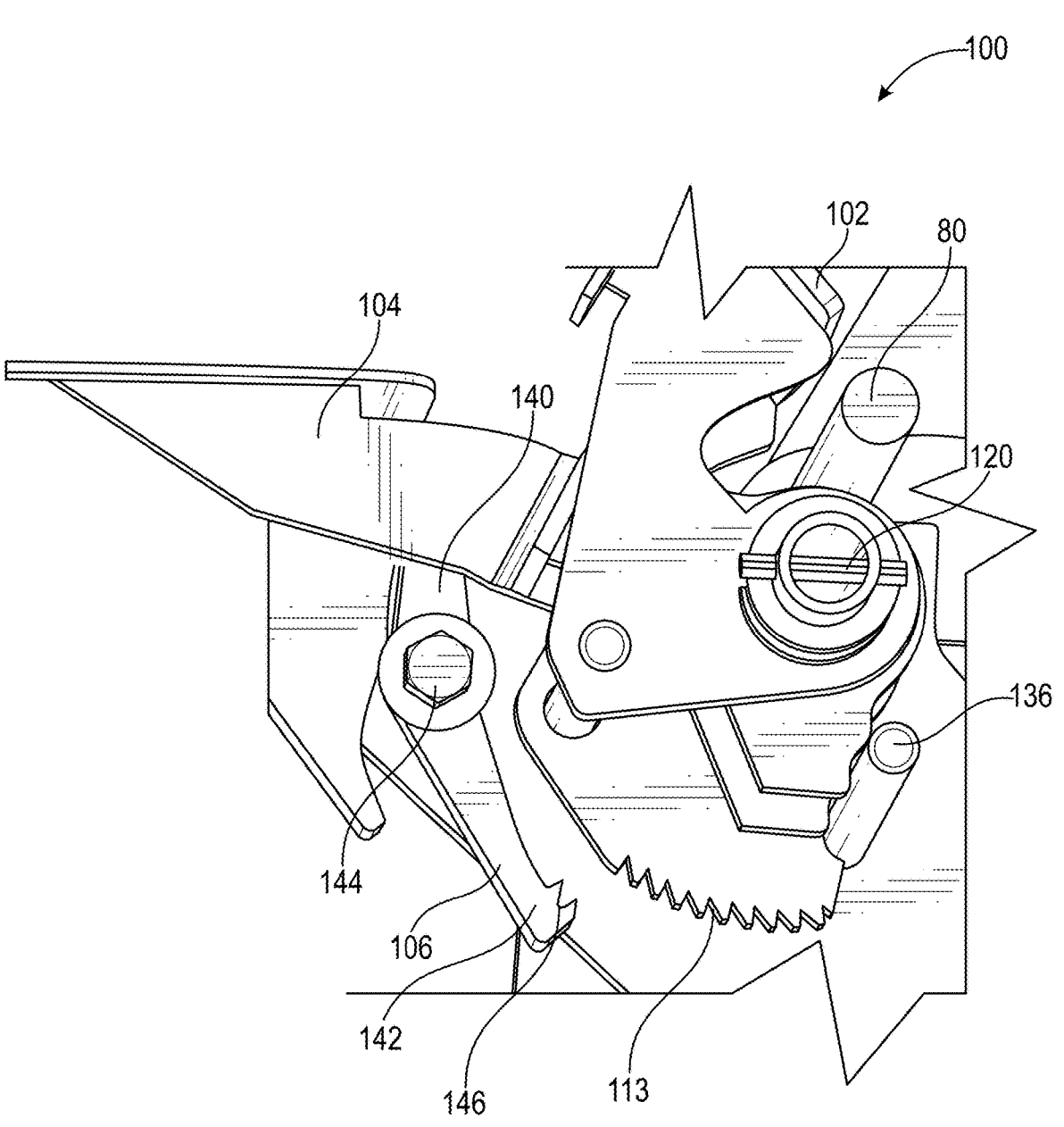
FIG. 16 is a top perspective view of the locking system of FIG. 13.

In FIG. 15, the operator continues to press on the foot engagement portion 132 of the second foot pedal 104 to cause the second foot pedal 104 to rotate counterclockwise about the rotation axis or pivot 120 such that the kicker portion 138 engages the bump stop 116 of the first foot pedal 102 to cause the first foot pedal 102 to rotate about the rotation axis or pivot 120 until the cam shape latch 110 disengages or releases from the bar 80. The first foot pedal 102 returns to the home position and the tank lid 48a is unlocked from the tank opening 42a.

To open the tank lid 48a, the handle 56a is engaged such that the operator presses down on the handle 56a and the pair of front linkages 57a as the front rollers 90a-b and the rear rollers 92a-b travel along the track openings 302a-b of the pair of guides 300a-b as described above. The handle 56a is operable between a closed position and an open position to lift the tank lid 48a and move the tank lid 48a along the pair of guides 300a-b to a fully open position. The operations are reversed to lift the tank lid 48a from the open position to the fully closed position and lock the locking system 100.

Beneficially, the locking system 100 uses fewer parts at least in part because of the single latching operation of the locking system 100. Beneficially, the rear pivot, i.e., the clevis pin 202 in the clevis opening 61 assists to keep the tank lid 48a clamped under the air pressure within the supply tank 40.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

The invention claimed is:

1. A supply tank system configured to contain a commodity on an agricultural machine, the supply tank system comprising:

a supply tank comprising a tank opening and a tank opening flange at least partially surrounding the tank opening;

a closure assembly comprising a tank lid operably coupled to the tank opening flange, the tank lid being movable between an open position and a closed position, where in the closed position the tank lid is configured to cover the tank opening, and where in the open position the tank lid is configured to uncover the tank opening;

a handle operably coupled to the tank lid, the handle configured to be maneuvered to move the tank lid between the open and closed positions;

a first lid flange and a second lid flange of the tank lid, the first lid flange being disposed opposite the second lid flange;

a seal coupled to the first lid flange and the second lid flange, where in the closed position the seal is compressed between the first lid flange, the second lid flange, and the tank opening flange to form a sealed connection between the tank lid and the tank opening;

a plurality of mechanisms coupled to the tank lid; and a pair of guides coupled to opposite sides of the tank opening flange, each of the pair of guides defining a guide opening for receiving at least one of the plurality of mechanisms, wherein the guide opening is defined in each of the pair of guides between a first end and a second end, the guide opening includes a climax portion located between the first and second ends arranged such that the climax portion extends above the tank lid when the tank lid is in the closed position;

wherein, in the closed position, the handle is in an upright position and the tank lid is sealingly coupled to the tank opening flange;

wherein, during movement from the closed position to the open position, the tank lid is lifted away from the tank opening flange via the handle to release the sealed connection such that the tank lid is raised above the tank opening flange, the tank lid moves along a curved path as the plurality of mechanisms slide from the first end along a first portion of the guide opening to the climax portion of the pair of guides, and the tank lid moves downwardly in a substantially linear direction as the plurality of mechanisms slide from the climax portion along a second portion of the guide opening of the pair of guides;

wherein, in the open position, the tank lid is located along a side of the tank at a position below a top edge of the tank opening flange and the handle is folded in a downward position to at least partially overlap the tank lid.

2. The supply tank system of claim 1, wherein, in the closed position, the first lid flange and second lid flange are located externally of the tank opening flange.

3. The supply tank system of claim 1, further comprising a clevis mechanism operably coupled to both of the second lid flange and the tank opening flange to enable the tank lid to pivot about the tank opening flange, wherein the clevis mechanism includes a clevis pin operably engaged with a clevis opening in the tank opening flange such that the clevis pin rotates in the clevis opening, further wherein the clevis opening is configured such that the clevis pin exits the clevis opening when the tank lid is in the open position.

4. The supply tank system of claim 1, wherein, as the tank lid is lifted away from the tank opening flange via the handle to release the sealed connection, at least one of the plurality of mechanisms slides from the first end of the guide opening along an arc portion to the climax portion within the guide opening.

5. The supply tank system of claim 4, wherein the guide opening comprises an arcuate portion between the first end and the climax portion.

6. The supply tank system of claim 5, wherein the tank lid is raised to a location at least partially above the tank opening flange as the at least one of the plurality of mechanisms slides through the arcuate portion to the climax portion.

7. The supply tank system of claim 4, wherein the guide opening comprises an elongate portion between the climax portion and the second end such that the tank lid moves downwardly as the plurality of mechanisms slide along the elongate portion of the guide opening.

8. The supply tank system of claim 4, wherein:

in the closed position, a first mechanism of the plurality of mechanisms is disposed at the first end and a second mechanism of the plurality of mechanisms is disposed at a location between the first end and the second end;

in the open position, the first mechanism is disposed at a location between the first end and the second end and the second mechanism is disposed at the second end.

9. The supply tank system of claim 1, further comprising a locking system configured to retain the tank lid in a locked position, the locking system configured to operably engage and lift the tank lid away from the tank opening during movement from the closed position to the open position.

10. The supply tank system of claim 1, wherein, in the closed position, the seal forms the sealed connection around the entire periphery of the tank opening.

11. In an agricultural machine having a supply tank with a tank opening, a closure assembly comprising:

a tank opening flange configured to at least partially surround the tank opening;

a tank lid operable between an open position and a closed position, the tank lid while in the closed position is configured to cover the tank opening, the tank lid while in the open position is configured to uncover the tank opening, the tank lid having a first lid flange opposite a second lid flange;

a handle operably coupled to the tank lid, the handle configured to be maneuvered to move the tank lid between the open and closed positions;

a plurality of mechanisms coupled to the tank lid; and a pair of guides coupled to opposite sides of the tank opening flange, each of the pair of guides defining a guide opening for receiving at least one of the plurality of mechanisms, wherein the guide opening is defined in each of the pair of guides between a first end and a second end, the guide opening includes an arcuate portion that extends from the first end to a climax portion located between the first and second ends wherein the arcuate portion has a length that corresponds to raising the tank lid to a maximum raised position when the tank lid is between the open and closed positions;

wherein, in the closed position, the handle is in an upright position and the tank lid is sealingly coupled to the tank opening flange;

wherein, during movement from the closed position to the open position, the handle is moved from an upright position to raise the tank lid from the tank opening flange, release a sealed connection between the tank lid and the tank opening, move the tank lid along a curved path as at least one of the plurality of mechanisms slides along the arcuate portion of the guide opening of the pair of guides, and move the tank lid downwardly relative to a side of the supply tank and uncover the tank opening as the at least one of the plurality of mechanisms slides along the climax portion to the second end of the guide opening of the pair of guides;

wherein, in the open position, the tank lid is located below a top edge of the tank opening flange and the handle is folded in a downward position to at least partially overlap the tank lid.

12. The closure assembly of claim 11, wherein, in the closed position, the first lid flange and second lid flange are located externally of the tank opening flange.

13. The closure assembly of claim 11, wherein, as the tank lid is lifted away from the tank opening flange via the handle to release the sealed connection, at least one of the plurality of mechanisms slides from the first end along the arcuate portion of the guide opening to an intermediate location within the guide opening.

14. The closure assembly of claim 13, wherein the tank lid is raised to a location at least partially above the tank opening flange as the at least one of the plurality of mechanisms slides through the arcuate portion to the intermediate location.

15. The closure assembly of claim 13, wherein the guide opening comprises an elongate portion between the intermediate location and the second end such that the tank lid moves downwardly as the plurality of mechanisms slide along the elongate portion of the guide opening.

16. The closure assembly of claim 13, wherein:

in the closed position, a first mechanism of the plurality of mechanisms is disposed at the first end and a second mechanism of the plurality of mechanisms is disposed at a location between the first end and the second end;

in the open position, the first mechanism is disposed at a location between the first end and the second end and the second mechanism is disposed at the second end.

17. In an agricultural machine having a supply tank with a tank opening, a closure assembly comprising:

a tank opening flange configured to at least partially surround the tank opening;

a tank lid operable between an open position and a closed position, the tank lid comprising a first lid flange opposite a second lid flange;

a handle operably coupled to the tank lid, the handle configured to be controlled to move the tank lid between the open and closed positions;

a seal coupled to the first lid flange and the second lid flange, where in the closed position the seal is configured to be compressed between the first lid flange, the second lid flange, and the tank opening flange to form a sealed connection between the tank lid and the tank opening;

a plurality of mechanisms coupled to the tank lid; and a pair of guides coupled to opposite sides of the tank opening flange, each of the pair of guides defining a guide opening for receiving at least one of the plurality of mechanisms, wherein the guide opening is defined in each of the pair of guides between a first end and a second end, the guide opening comprising an intermediate location between the first end and the second end;

wherein, in the open position, the handle is in a folded position such that the handle at least partially overlaps the tank lid;

wherein, during movement from the open position to the closed position, the handle is moved from the folded position to controllably move the tank lid upwardly relative to a side of the supply tank as the plurality of mechanisms slide along a first portion of the pair of guides, move the tank lid along a curved path as the plurality of mechanisms slide along a second portion of the pair of guides such that the seal is positioned above the tank opening flange, contact the seal with the tank opening flange, and lower the tank lid to compress the seal between the tank opening flange, the first lid flange, and the second lid flange;

wherein, as the plurality of mechanisms slide along the first portion of the pair of guides from the second end to the intermediate location, the tank lid moves upwardly relative to the side of the supply tank;

wherein, as the plurality of mechanisms slide along the second portion of the pair of guides from the intermediate location to the first end, the tank lid moves along an arcuate path until the seal is compressed between the first lid flange, the second lid flange, and the tank opening flange.

18. The closure assembly of claim 17, wherein, in the open position, the tank lid is located below a top edge of the tank opening flange and the handle is folded in a downward position to at least partially overlap the tank lid.

19. The closure assembly of claim 17, further comprising a clevis mechanism operably coupled to both of the second lid flange and the tank opening flange to enable the tank lid to pivot about the tank opening flange, wherein the clevis mechanism includes a clevis pin operably engaged with a clevis opening in the tank opening flange such that the clevis pin rotates in the clevis opening, further wherein the clevis opening is configured such that the clevis pin exits the clevis opening when the tank lid is in the open position.

* * * * *